Sept. 7, 1965      D. J. CONNER      3,204,752
BOTTLE FEEDING APPARATUS FOR WASHER
Filed Aug. 1, 1963      2 Sheets-Sheet 1
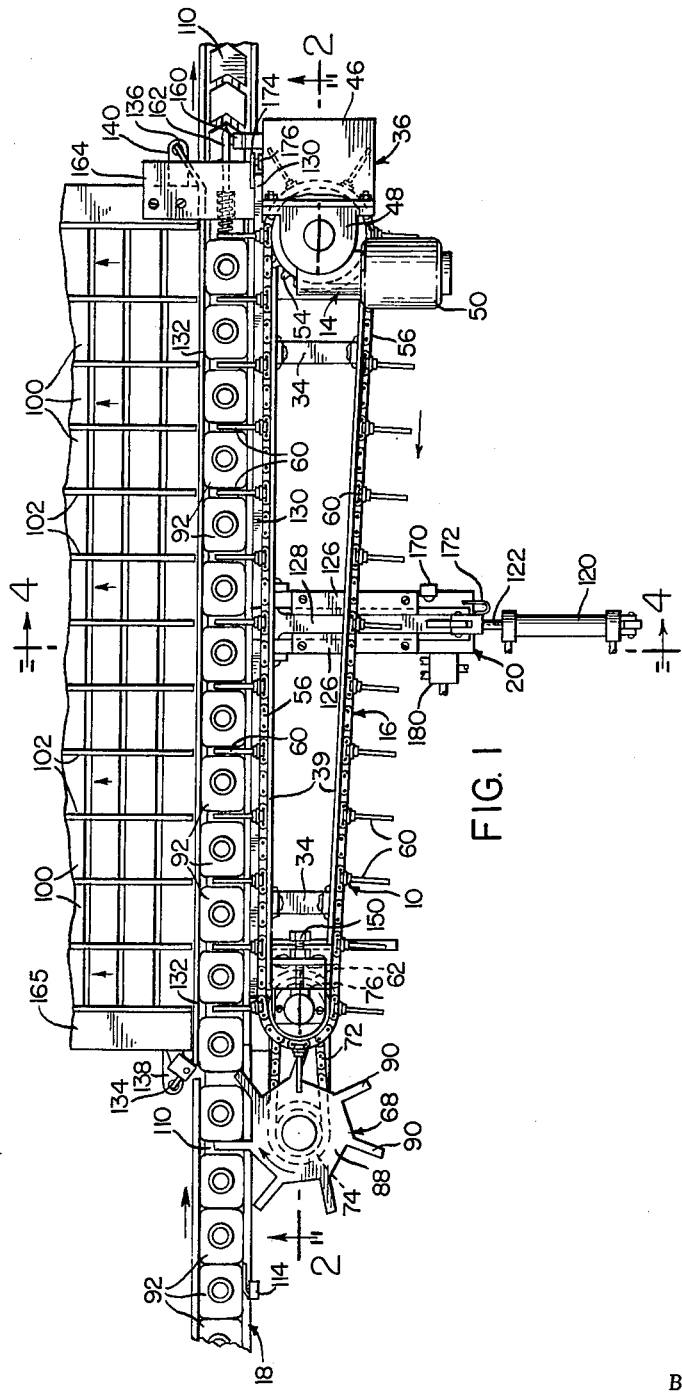
INVENTOR.
DONALD J. CONNER
BY *Benjamin W. Colman*
ATTORNEY

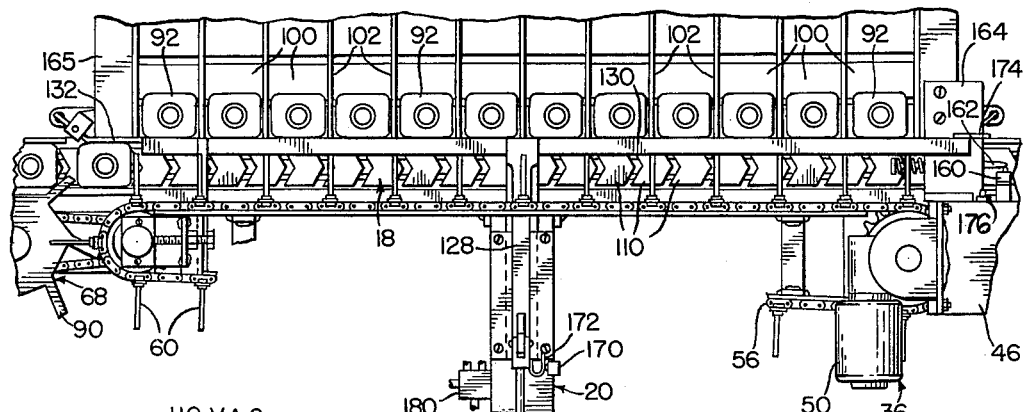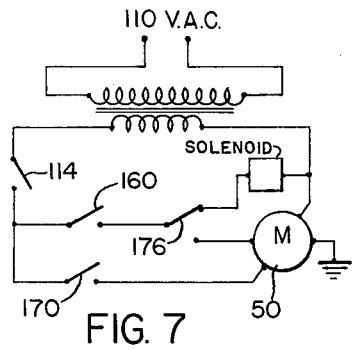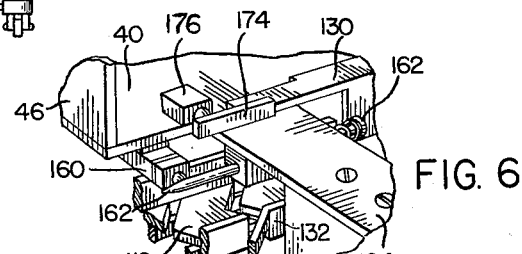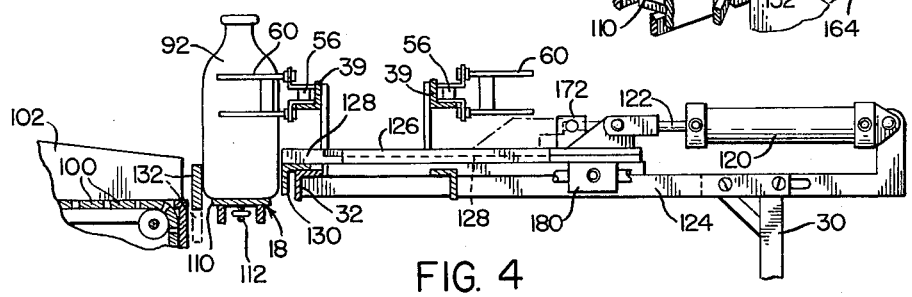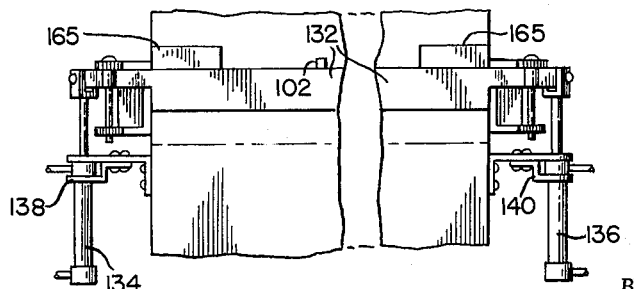

United States Patent Office 3,204,752
Patented Sept. 7, 1965

3,204,752
BOTTLE FEEDING APPARATUS FOR WASHER
Donald J. Conner, 23821 Joanne Ave., Warren, Mich.
Filed Aug. 1, 1963, Ser. No. 299,271
8 Claims. (Cl. 198—34)

This invention pertains to a bottle feeding apparatus and more particularly to apparatus which moves bottles simultaneously from one conveyor in a fixed number onto conveyors feeding a bottle washing machine.

The invention involves a machine which translates bottles, used in the milk and dairy industry, by a rotary gate and finger selecting device on a conveyor into washer feeding position. Hydraulically operated pistons lower a conveyor guide gate and move a pusher bar engaging the bottles laterally of their conveyor onto individual washer conveyors that carry the bottles into the washing equipment. A number of bottles at least equal to the number of washer conveyors are discharged thereonto simultaneously. The mechanism is electrically actuated in cycle sequence to load the feeding conveyor by a gate wheel and chain driven fingers spaced apart to accommodate a bottle therebetween, to lower the guide gate adjacent the feeding conveyor, to push the bottles laterally off of the feeding conveyor and onto the washer conveyors, to retract the pusher bar, to raise the guide gate, and to again start feeding the conveyor with bottles. The device is arranged to handle a given number of bottles in a cycle, such number being up to the number of washer conveyors which are disposed normal and laterally of the feeding conveyor.

The apparatus of this invention is compact and can be coordinated with a single file bottle feeding conveyor. The apparatus is capable of being mounted on such conveyor or it can be floor mounted. The gate wheel and drive fingers are chain driven from a power drive which coordinates the cycle functions of the apparatus.

It is an object of the invention to provide a bottle feeding apparatus for a bottle washer having feed-in conveyors. Another object is to provide such apparatus that a number of bottles up to the number of washer feed-in conveyors are simultaneously translated onto such conveyors from the apparatus of this invention. A further object is to provide mechanism in such apparatus that functions sequentially to charge the apparatus with bottles from a feeding conveyor, to stop such charge when bottles are in position for translation to the washer feed-in conveyors, to translate the bottles to the latter conveyors, and to start the cycle of bottle feeding again. Still another object is to provide mechanism which is relatively compact and adapted to coordinate with bottle feeding conveyors and with washer conveyors.

Various further and more specific objects, features and advantages of the invention will appear from the description given below, taken in connection with the accompanying drawing(s), illustrating by way of example a preferred form of the invention.

FIGURE 1 is a top plan view of apparatus embodying the invention.

FIGURE 2 is a vertical longitudinally extending sectional view, with a substantial portion in elevation, taken on the line 2—2 of FIGURE 1.

FIGURE 3 is a top plan view substantially as in FIGURE 1, but showing the bottles translated laterally from the feeding conveyor to the washer feed-in conveyors.

FIGURE 4 is a vertical transverse sectional view taken substantially on the line 4—4 of FIGURE 1.

FIGURE 5 is a fragmentary elevational view of a portion of the apparatus at the left end thereof as shown in FIGURE 1, showing the hydraulic piston in gate elevating position.

FIGURE 6 is a fragmentary perspective view taken at the right hand end of the apparatus illustrated in FIGURES 1 and 2.

FIGURE 7 is a wiring diagram of the electrical control system.

As shown in the several views of the drawings and with particular reference to FIGURES 1 and 2, the bottle feeding apparatus 10 comprises a frame 12, power drive mechanism 14, bottle spacing mechanism 16, a bottle feeding conveyor 18, and bottle translating mechanism 20.

The frame 12 is a simple angle or channel-iron structure having legs 30, longitudinally extending members 32 and transverse rib members 34. At one end of the frame (the right in FIGURES 1 and 2) a power drive support structure 36 is secured to the members 32. A vertically depending plate 38 is secured to one of the members 32 adjacent the conveyor 18. The frame also mounts chain guide members 39 which are supported by the rib members 34 that extend across and upwardly of the frame members 32 to hold the guide members 39 adjacent and inwardly of the bottle spacing mechanism 16.

The power drive support structure 36, shown at the right in FIGURES 1 and 2, comprises a base plate member 40 mounting the drive shaft 42 in lower bearing 44, a bracket upright 46 secured to and at the outboard end of the member 40 for mounting a reduction gear drive 48 with its electrically operated motor 50, and upper shaft bearing 52.

Power drive mechanism 14 comprises the brake motor 50, the gear drive 48 and the driven shaft 42 on which is mounted the drive gear 54 engaging chain drive 56.

Bottle spacing mechanism 16 comprises the chain drive 56, the dual finger units 60 secured to component links of the chain drive at spaced intervals, the driven gear 62 mounted on shaft 64 supported by the structure 66 at the left end of the apparatus, and the star or gate wheel 68 mounted on shaft 70 and driven by the chain drive 72 through gear 74. Chain drive 56 operates on sprocket gears 54 and 62, gate wheel 68 being driven by chain drive 72 operating through driven gear 74 and drive gear 76 mounted on shaft 64. The structure 66 comprises a lower plate 78 secured to frame 12, an upright member 80 and a top member 82 supporting the shaft bearings 84 and 86. The star or gate wheel 68 comprises a body 88 having outwardly extending bottle-engaging projections 90 so arranged that each projection sweeps into the area created by the radii at the adjacent corners of two adjacent bottles 92 being moved to the mechanism 16 by and on the conveyor 18.

The gate wheel 68 is synchronized with the chain drive fingers 60 so that as bottles 92 are moved along by and between the projections 90, the fingers 60 sweep into the space between such bottles separating them in spaces which will come into register with the washer feed-in conveyors 100 operating between gates or spacers 102.

The conveyor 18 may be of any suitable type that translates bottles 92 to the apparatus 10, a preferred type being a plate conveyor having an endless series of plates 110 conjoined by a chain 112 secured to the underside of the plates, the chain being driven by a suitable drive mechanism (not shown). The plates are usually lubricated on their upper surfaces with a liquified or dilute solution of soap or detergent so as to protect the bottles 92 from damage or scratching as the plates slide under the bottles when the latter are brought to a temporary halt. The conveyor 18 is designed to and operates continuously during normal working periods, bringing empty bottles from a case unloading station to the washing equipment and the bottle feeding apparatus 10. Secured to the framing of the conveyor 18 is a micro-switch 114 which is contact responsive to the bottles 92 that are carried along on the conveyor plates. This switch is normally open and circuit connected with the power drive motor 50. When bottles fail to pass on the conveyor 18 and to contact the switch, it will open the circuit to the motor 50 and stop the bottle spacing mechanism.

The bottle translating mechanism 20 comprises the hydraulically operated piston cylinder 120, a piston rod 122 driven by the piston, a support 124 for the piston and rod mounted on the frame 12, guide plates 126, 126 for the piston rod connected slide 128 attached to a transverse pusher bar 130 which extends the full width of the washer feed-in conveyors 100 so as to move all bottles in its path onto such conveyors. Spaced from the pusher bar on the other side of the bottles 92 and conveyor 18 is a guide gate 132 supported on hydraulically operated pistons 134, 136 attached to the frame 12 by brackets 138, 140 respectively. Gate 132 is the normally elevated position shown in full lines in FIGURE 4 and serves as a guide wall for the bottles as they are moved along or held against movement on the conveyor plates 100 so as to prevent their fall from the conveyor, particularly when chain drive 56 is halted. When the bottles are to be translated to the washer feed-in conveyors 100, the gate 132 is lowered to the position in broken lines, permitting the bottles to move from conveyor 18 laterally thereof as pusher bar 130 is moved by the piston-driven slide 128, as shown more clearly in FIGURE 3.

Means for applying tension on the chain drive 56 is supplied by an adjusting screw 150 mounted on the plate member 80 and operating against the chain drive shaft bearing 86 at the left end of the apparatus 10.

Control means for electric motor 50 is not shown but usual controls are employed for it and for the bottle feeding conveyor 18. The bottle spacing mechanism 16 is set in motion when the power drive mechanism 14 is energized. In order that the rotation of the bottle spacing mechanism 16 be halted to permit lateral translation of the bottles 92 from conveyor 18, a microswitch 160 mounted on support 46 is engaged by a retractable blade or contact finger 162 extending into the area of the washer feed-in conveyors 100, at the right in FIGURE 1. The blade 162 is slidingly mounted for movement on the frame portion 164 which is attached to the frame 12 and overlies the conveyor 18 at the left end of the washer conveyors 100. The switch 160 stops the bottle spacing mechanism 16 and actuates the gate air cylinders 134, 136.

As the pusher bar 130 moves forwardly and retracts, its right end slides upon the support 164 and its left end upon the support 165 at the left end of the pusher bar, so that the latter is fully supported at its ends. Medially, the slide 128 is secured at its forward end to the pusher bar, providing central support for the bar.

The bottle translating mechanism 20 is normally in the position shown in FIGURES 1 and 2. A microswitch 170, normally in open position, is engageable by the contact blade 172 mounted on the slide 128 when the slide has moved to its most forward position, FIGURE 3. This switch energizes the air cylinder 120 for retraction of the slide. Upon retraction to initial position, the contact 174 mounted on the right end of the pusher bar (FIGURE 1) engages the micro-switch 176, mounted above the micro-switch 160, reinitiating movement in the bottle spacing mechanism 16.

A "Bellows" air valve 180 is mounted on the support 124. Conduits from this valve lead and connect to the cylinder 120 and the cylinders 134 and 136. The valve is of a construction that is electrically operated by the micro-switches 160 and 170, and it is served by a compressed air supply produced by equipment (not shown) available from a number of sources of manufacture.

In operation, the apparatus 10 functions as follows. Bottle feeding conveyor 18 is set in motion, carrying bottles 92 in close juxtaposition to the gate wheel 68. Switch 176, which is normally closed, completes the circuit to the power drive mechanism 14 setting in motion the chain drive 56, the chain drive 72 and the gate wheel 68. The gate 132 is in its normally elevated position, as seen in FIGURES 1 and 4, while the drive chain 56 and gate wheel 68 are in operation moving bottles 92 into position for translation to the washer feed-in conveyors 100. The drive chain 56 and the gate wheel 68 are synchronized for speed with the conveyor 18 whose plates 110 carry the bottles along to the gate wheel which spaces and moves them by projections 90 into position between the horizontally spaced dual fingers 60. So long as bottles 92 pass along and in contact with the micro-switch 114, which is normally open, the switch will remain closed and maintain power to the brake motor 50. When bottles are not carried on conveyor 18 against the switch, it will open, stopping the motor and the spacing mechanism 16. Although dual fingers are shown at each position on the drive chain, it will be understood that flat blades or single fingers can also be utilized. In addition, the fingers may be moved closer together horizontally, or further apart, to accommodate bottles of different transverse dimensions or forms, in which case the gate wheel projections are also modified so as to synchronize with the fingers.

As bottles 92 move down the conveyor 18 to the contact 162, they are spaced apart so as to come into register with the transversely moving washer feed-in conveyors 100 when the contact is touched and moved by the first bottle, actuating the micro-switch 160. Upon actuation of that switch, air is passed to the hydraulic cylinders 134 and 136 at each end of the machine, forcing the pistons therein downwardly and bringing the gate 132 below the level of the conveyor plates 110. Simultaneously, power to the chain drive motor 50 is cut off, stopping the chain drive 56 and gate wheel 68 from further movement. The plate conveyor 18, however, continues to move under the bottles 92 which are now at a halt thereon. Being lubricated, the plates 110 slip easily under bottles without marring them. Another simultaneous action also results from the actuation of switch 162, which is the admission of air to hydraulic cylinder 120, forcing its piston forwardly and driving the pusher bar 130 against the bottles 92 which are being held in register with the feed-in conveyors 100 by the fingers 60, FIGURE 3.

As the pusher bar slide 128 moves forwardly, the contact bar or blade 172 engages micro-switch 170 which cuts off further air supply to the rear end of the cylinder 120, reverses the air supply for admission to the forward end of cylinder 120 so as to retract the pusher bar 130, and reverses the air supply to the vertically operating cylinders 134, 136 so as to raise the guide-gate 132 into its normally elevated position (FIGURE 4). As the pusher bar 130 retracts, the contact 174 at the end thereof engages micro-switch 176 closing the circuit to motor 50 and chain drive 56 is again set in motion to move bottles 92 into position between the fingers 60.

The material utilized in the frame 12 is primarily steel, although other metals can also be used. The drive chains 56 and 72 are preferably of the link variety in order to obtain maximum accuracy and performance. The hydraulic cylinders 120, 134 and 136 are air operated from a central air supply source. The drive mechanisms and conveyors are made principally of steel, although bearings and slide surfaces may be of suitable bearing metals such as bronze or other suitable metals. Contact sensitive electrical micro-switches 114, 160, 170 and 176 are utilized for fast-acting service in operation of the several components of the apparatus. Switches 114, 160, 170 and 176 are all normally open switches.

Having described an embodiment of this invention in its simplest terms, it is to be understood that the features of construction may be changed and varied in greater or lesser degree without departing from the essence of the invention.

I claim:

1. In apparatus for feeding bottles to bottle washing equipment, bottle conveyor means transporting bottles in close juxtaposition single file alignment, bottle spacing mechanism having
- a gate wheel separating said bottles from their close juxtaposition into spaced apart relationship on said conveyor means, and
- means for maintaining said bottles in such spaced apart relationship while in movement upon said conveyor means,
    - said maintaining means comprising an endless series of uniformly spaced apart finger units operable in conjunction and in registration with the projections of said gate wheel, said conveyor means transporting said bottles to and in conjunction with said spacing mechanism, means for simultaneously translating a predetermined plurality of said spaced apart bottles laterally from said conveyor means and onto said washing equipment,
- said translating means comprising a bottle pusher bar normally disposed in withdrawn position adjacent said bottle conveyor means, a movable gate normally disposed in elevated position adjacent said conveyor means as a guide for said bottles when traveling on said conveyor means, and means for lowering said gate below the plane of said bottles to permit lateral translation of said predetermined plurality of bottles from said conveyor means upon contact and movement by said pusher bar and for elevating said gate into normal bottle guiding position upon retraction of said pusher bar into normal withdrawn position, power means for operating said bottle conveyor means, said bottle spacing mechanism, and said bottle translating means, and bottle contact responsive means on said conveyor means for actuating said power means to operate said bottle spacing mechanism.

2. The structure defined in claim 1, and second bottle contact responsive means in association with said power means to halt the movement of said spacing mechanism and to operate said bottle translating means.

3. The structure defined in claim 2, and third contact responsive means operable with said power means upon full forward movement of said translating means to retract said translating means.

4. The structure defined in claim 3, and fourth contact responsive means operable with said power means upon full retraction of said translating means to operate said bottle spacing mechanism.

5. In apparatus for feeding bottles to bottle washing equipment having a plurality of parallel bottle receiving conveyors, bottle conveyor means transporting bottles in single file close juxtaposition,
- said conveyor means being in continuous operation, bottle spacing mechanism having
- a gate wheel separating each of said bottles from their close juxtaposition into a spaced apart relationship on said conveyor means,
- and means for maintaining said bottles in such spaced apart relationship while in movement upon said conveyor means,
    - said maintaining means comprising an endless series of uniformly spaced apart finger units operable in conjunction and in registration with the projections of said gate wheel, said conveyor means transporting said bottles to and in conjunction with said spacing mechanism, means for translating simultaneously a predetermined plurality of said spaced apart bottles laterally from said conveyor means when said bottles are in register with said bottle receiving conveyors of said washing equipment,
- said translating means comprising a bottle pusher bar normally disposed in withdrawn position adjacent said bottle conveyor means, a movable gate normally disposed in elevated position adjacent said conveyor means as a guide for said bottles when traveling on said conveyor means, and means for lowering said gate below the plane of said bottles to permit lateral translation of said predetermined plurality of bottles from said conveyor means upon contact and movement by said pusher bar and for elevating said gate into normal bottle guiding position upon retraction of said pusher bar into normal withdrawn position, power means for operating said bottle conveyor means, said bottle spacing mechanism and said bottle translating means, and bottle contact responsive means in association with said power means for actuating said spacing mechanism.

6. The structure defined in claim 5, and in which said means for maintaining said bottles in spaced relationship comprises an endless series of chain supported outwardly projecting fingers synchronized for movement with said gate wheel to hold each bottle discharged by said gate wheel in spaced relationship to next adjacent bottles, said fingers extending laterally of said bottles and in the plane thereof.

7. The structure defined in claim 5, and in which said bottle conveyor means is disposed adjacent said bottle receiving conveyors and in an operating direction normal to the operating direction of said parallel bottle receiving conveyors.

8. The structure defined in claim 5, and including bottle guide means disposed laterally of and between said conveyor means and said bottle receiving conveyors, said bottle guide means comprising a retractable strip member extending upwardly above the plane of said conveyor means when said bottles are in transport thereon and retractable below the plane of said conveyor means when said bottle translating means is actuated for operation, and means for supporting and retracting said strip member.

References Cited by the Examiner

UNITED STATES PATENTS 2,452,376  10/48  Holstebroe _____ 53—160
2,679,963  6/54   Neal _____ 198—31.2

SAMUEL F. COLEMAN, *Primary Examiner.*